Figure 1:
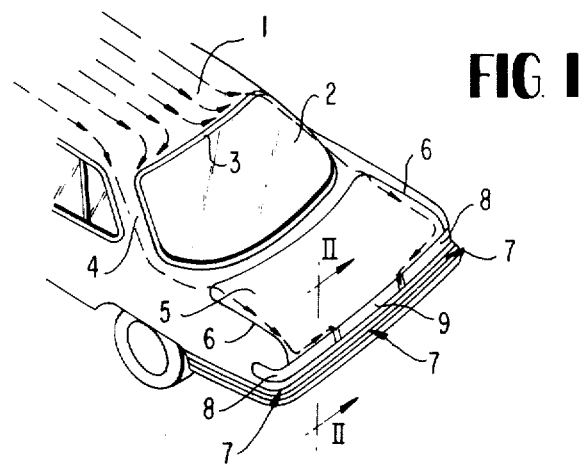

United States Patent [19]

Götz

[11] 3,892,439
[45] July 1, 1975

[54] ARRANGEMENT FOR PREVENTING THE SOILING OF DEVICES ARRANGED AT THE REAR END OF MOTOR VEHICLES

[75] Inventor: Hans Götz, Boblingen, Germany

[73] Assignee: Daimler-Benz Aktiengesellschaft, Germany

[22] Filed: Dec. 15, 1972

[21] Appl. No.: 315,456

[52] U.S. Cl. ............................... 296/137 R; 296/76
[51] Int. Cl. ............................................ B62d 25/08
[58] Field of Search ... 296/76, 93, 146, 154, 137 R; 49/475, 476

[56] References Cited
UNITED STATES PATENTS

| | | | |
|---|---|---|---|
| 1,592,466 | 7/1926 | Morgan | 296/76 |
| 2,556,775 | 6/1951 | Oswald | 296/93 |
| 2,674,487 | 4/1954 | Wernig | 49/476 |
| 3,343,303 | 9/1967 | Wanlass | 296/76 |
| 3,638,372 | 2/1972 | Rosenthal | 49/476 |
| 3,711,147 | 1/1973 | Higuchi | 296/137 R |

Primary Examiner—Philip Goodman
Assistant Examiner—John A. Carroll
Attorney, Agent, or Firm—Craig & Antonelli

[57] ABSTRACT

An installation for preventing the soiling of devices such as, for example, rear lights and license tags, arranged at the rear end of motor vehicles, particularly of passenger motor vehicles, in which a collecting channel extending at least over the structural length of the devices to be protected is provided above these devices; the collecting channel thereby discharges the soiled water within an area free of such devices.

18 Claims, 3 Drawing Figures

3,892,439

ARRANGEMENT FOR PREVENTING THE SOILING OF DEVICES ARRANGED AT THE REAR END OF MOTOR VEHICLES

The present invention relates to an arrangement for preventing the soiling of devices, such as rear lights and license tages, arranged at the rear end of motor vehicles, especially of passenger motor vehicles.

During unfavorable weather conditions, the wake-flow of motor vehicles is enriched by turbulently thrown-up particles containing dirtied water, by which are acted upon the vehicles which follow the preceding vehicle at a short distance or which pass the same. This dirtied or soiled water deposits itself at the front section and at the windshield of the trailing or passing vehicle, from where it travels along the roof surface in the direction toward the rear columns or also toward the rear window. From there, this soiled water reaches the rear section of the vehicle and flows off the rear unobstructed over the rear lights and license tags while at the same time depositing thereat dirt. Especially the rear lights lose a considerable part of their light yield or light output as a result thereof, whence following vehicles become aware often too late of intentions of changes in the drive on the part of the proceding person.

It is the aim of the present invention to avoid the disadvantages described above and to provide an installation, by means of which the soiled water is kept away from devices arranged at the vehicle rear end.

Consequently, an arrangement for preventing the soiling of devices such as rear light and license tags arranged at the rear end of motor vehicles, especially of passenger motor vehicles is proposed in which, according to the present invention, a collecting channel or groove extending at least over the structural length of the devices to be protected is provided above these devices, which channel or groove conducts the soiled water into an area free of these devices.

It may be advantageous if the collecting channel or groove extends over the entire rear end width and is provided with discharge apertures in areas free of the devices. The collecting groove or channel may be constructed thereby as decorative rod.

In passenger motor vehicles with a rear lid, whose rear lid gaps or joints extending in the driving direction are preferably constructed as discharge channels or grooves, it is appropriate to cover off the collecting channel or groove by the lower edge of the rear lid. As a result thereof, a discharge of the soiled water is achieved which is undisturbed by the flow conditions prevailing within this area.

A simple and cost-saving construction can be achieved if the collecting groove or channel is embedded or inset in a sealing profile serving the rear seal of the rear lid.

Accordingly, it is an object of the present invention to provide an arrangement for preventing the soiling of devices arranged at the rear end of motor vehicles, especially of passenger motor vehicles, which avoids by simple means the aforementioned shortcomings and drawbacks encountered in the prior art.

Another object of the present invention resides in an installation for motor vehicles which keeps the dirty water away from devices such as rear lights and license tags arranged at the rear end of passenger motor vehicles.

A further object of the present invention resides in an arrangement for preventing dirtied water from reaching the rear lights and/or license tags arranged at the rear end of motor vehicles after flowing from the front column and windshield of the vehicle over the roof and along the rear columns and/or rear window in the direction toward these devices.

Still a further object of the present invention resides in an arrangement of the type described above, which permits the discharge of any dirty water reaching the rear end of the vehicle unimpaired by flow conditions prevailing thereat.

Another object of the present invention resides in a simple and cost-saving construction for preventing the soiling of devices such as rear lights and license tags arranged at the rear end of motor vehicles.

Figures 2A, 2B:
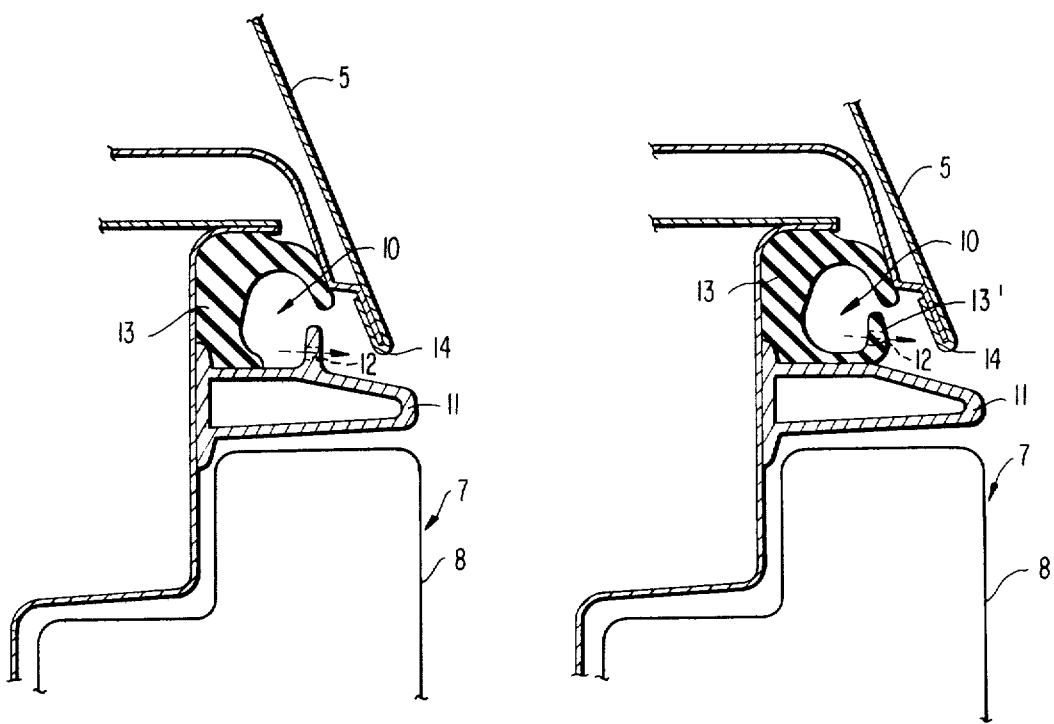

These and other objects, features and advantages of the present invention will become more apparent from the following description when taken in connection with the accompanying drawing which shows, for purposes of illustration only, two embodiments in accordance with the present invention, and wherein:

FIG. 1 is a partial perspective view of the rear end of a passenger motor vehicle, taken from above the left rear corner of the vehicle; and FIGS. 2a and 2b are cross-sectional views of two modified embodiments of a collecting channel in accordance with the present invention, on an enlarged scale and taken along line II—II of FIG. 1.

Referring now to the drawing wherein like reference numerals are used throughout the various views to designate like parts, and more particularly to FIG. 1, the soiled water flow which forms within the rear area of a passenger motor vehicle is indicated in this figure by the dash lines provided with arrows. The dirty or soiled water thereby flows over the vehicle roof 1 primarily in the direction toward the rear window 2, from which it is deflected toward the rear columns 4 by guide means not illustrated in detail and of conventional construction, which may be a part of the rear-window decorative frame 3. From there, the soiled water reaches a rear lid 5 where it is conducted into rear lid gaps or joints 6 which are constructed in a conventional manner as covered discharge grooves or channels. At the end of each discharge groove or channel, the soiled water flows approximately parallel to devices generally designated by reference numeral 7—which represent rear lights 8 and a license tag 9—in the direction toward the vehicle center in order to flow off in the downward direction between the rear lights 8 and the license tag 9.

Two embodiments of collecting grooves or channels generally designated by reference numeral 10 and extending in the vehicle transverse direction are illustrated in FIGS. 2a and 2b. In the embodiment according to FIG. 2a, the collecting groove or channel is constituted by a decorative rod 11 which is provided within the area free of the devices 7 with discharge apertures 12. The rear lid 5 thereby supports itself at a sealing profile 13 whereas the lower edge 14 of the rear lid 5 covers off the collecting groove or channel 10.

The embodiment according to FIG. 2b differs from that according to FIG. 2a only in that the collecting groove or channel 10 is embedded or provided in a sealing profile 13 itself which also serves the purpose of sealing the rear lid 5 in proximity to the lower edge 14 of the rear lid. In this embodiment the discharge apertures 13 are provided directly in the sealing profile 13, and more particularly in the upwardly extending projection 13' thereof.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. In an arrangement for preventing the soiling of vehicle devices, said devices being mounted on the rear end of motor vehicles, the improvement comprising a collecting channel means for collecting soiled water forming at the rear end of the motor vehicles, said collecting channel means being mounted on said rear end above said devices and extending at least over distances corresponding to structural lengths of the devices, said collecting channel means discharging the soiled water within an area free of said devices, wherein the collecting channel means extends over the entire width of the rear end of the vehicle and is provided with discharge aperture means within areas free of said devices, wherein the collecting channel means is constructed as a decorative rod, and wherein said decorative rod includes an upwardly directed projection forming part of the collecting channel means and containing the discharge aperture means.

2. In an arrangement for preventing the soiling of vehicle devices, said devices being mounted on the rear end of motor vehicles, the improvement comprising a collecting channel means for collecting soiled water forming at the rear end of the motor vehicles, said collecting channel means being mounted on said rear end above said devices and extending at least over distances corresponding to structural lengths of the devices, said collecting channel means discharging the soiled water within an area free of said devices, wherein the collecting channel means extends over the entire width of the rear end of the vehicle and is provided with discharge aperture means within areas free of said devices, wherein the collecting channel means is constructed as a decorative rod, wherein said motor vehicles are passenger motor vehicles with a rear lid having rear lid gaps extending in the driving direction, said rear lid gaps being constructed as discharge grooves, and said collecting channel means being covered off by the lower edge of the rear lid, and wherein said decorative rod includes an upwardly directed projection forming part of the collecting channel means and containing the discharge aperture means.

3. In an arrangement for preventing the soiling of vehicle devices, said devices being mounted on the rear end of motor vehicles, the improvement comprising a collecting channel means for collecting soiled water forming at the rear end of the motor vehicles, said collecting channel means being mounted on said rear end above said devices and extending at least over distances corresponding to structural lengths of the devices, said collecting channel means discharging the soiled water within an area free of said devices, wherein the collecting channel means is constructed as a decorative rod, and wherein said decorative rod includes an upwardly directed projection forming part of the collecting channel means and containing discharge aperture means.

4. An arrangement for preventing obscuring of vehicle rear portions comprising
  visual devices of the vehicle arranged at the vehicle rear portions, said visual devices providing information from the vehicle rear portions to a following vehicle,
  collecting channel means for collecting soiled water forming at the rear portions of the vehicle during poor weather conditions, said collecting channel means being disposed at said vehicle rear portions above said visual devices and extending at least over distances corresponding to the dimensions of said visual devices in the vehicle transverse direction, and
  discharge means connected to said collecting channel means for discharging the soiled water collected by said collecting channel means in areas of said rear portions free from said visual devices to prevent obscuring of said visual devices.

5. An arrangement according to claim 4, wherein said visual devices include at least one of vehicle rear lights and vehicle license tags.

6. An arrangement according to claim 5, wherein said visual devices include both vehicle rear lights and vehicle license tags.

7. An arrangement according to claim 4, wherein said visual devices are mounted in said vehicle rear portions, and said collecting channel means is formed as a part of said vehicle rear portions above said visual devices.

8. An arrangement according to claim 7, wherein said collecting channel means is constructed as a decorative rod.

9. An arrangement according to claim 8, wherein said decorative rod includes an upwardly extending projection forming a part of said collecting channel means, and said discharge means are formed in said upwardly extending projection.

10. An arrangement according to claim 9, wherein said collecting channel means extends over the entire width of the vehicle rear portions in the vehicle transverse direction.

11. An arrangement according to claim 9, wherein said visual devices include both vehicle rear lights and vehicle license tags.

12. An arrangement according to claim 8, further comprising a vehicle rear lid formed in said vehicle rear portion above said visual devices, wherein said vehicle rear lid includes rear lid gaps extending in the driving direction, said rear lid gaps forming guide groove means for channeling the soiled water, and wherein said collecting channel means is connected to ends of said rear lid gaps to collect the soiled water in said rear lid gaps, and said collecting channel means is covered by an edge of said rear lid.

13. An arrangement according to claim 12, wherein said collecting channel means is formed within a sealing profile means serving as a rear seal for said rear lid.

14. An arrangement according to claim 13, wherein said sealing profile means includes an upwardly extending projection, and wherein said discharge means are formed in said upwardly extending projection.

15. An arrangement according to claim 14, wherein said visual devices include both vehicle rear lights and vehicle license tags.

16. An arrangement according to claim 9, further conprising a vehicle rear lid formed in said vehicle rear portions above said visual devices, wherein said vehicle rear lid includes rear lid gaps extending in the driving direction, said rear lid gaps forming guide groove means for channeling the soiled water, and wherein said collecting channel means is connected to ends of said rear lid gaps to collect the soiled water in said rear lid gaps, and said collecting channel means is covered by an edge of said rear lid.

17. An arrangement according to claim 16, wherein said collecting channel means is formed between said upwardly extending projection of said decorative rod and a sealing profile means, said sealing profile means serving as a rear seal for said rear lid.

18. An arrangement according to claim 17, wherein said visual devices include both vehicle rear lights and vehicle license tags.

* * * * *

UNITED STATES PATENT OFFICE
CERTIFICATE OF CORRECTION

Patent No. 3,892,439              Dated      July 1, 1975

Inventor(s) Hans Götz

It is certified that error appears in the above-identified patent and that said Letters Patent are hereby corrected as shown below:

Title page, insert the following:

[30]          Foreign Application Priority Data

December 17, 1971     Germany... P 21 62 688.0

Signed and Sealed this

*twenty-first* Day of *October 1975*

[SEAL]

*Attest:*

RUTH C. MASON                C. MARSHALL DANN
*Attesting Officer*               *Commissioner of Patents and Trademarks*